United States Patent
Jin et al.

(10) Patent No.: US 11,019,016 B2
(45) Date of Patent: May 25, 2021

(54) SUBGROUP MESSAGING WITHIN A GROUP-BASED MESSAGING INTERFACE

(71) Applicant: International Business Machines Corporation, Armonk, NY (US)

(72) Inventors: Yuan Jin, Shanghai (CN); Xiao Cao Cao, Shanghai (CN); Yin Qian, Shanghai (CN); Xin Chen Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/172,756

(22) Filed: Oct. 27, 2018

(65) Prior Publication Data
US 2020/0137013 A1 Apr. 30, 2020

(51) Int. Cl.
*H04L 12/58* (2006.01)
*H04L 12/18* (2006.01)

(52) U.S. Cl.
CPC ............ *H04L 51/14* (2013.01); *H04L 12/185* (2013.01); *H04L 12/1813* (2013.01); *H04L 51/04* (2013.01); *H04L 51/32* (2013.01)

(58) Field of Classification Search
CPC .............................. H04L 51/04; H04L 65/403
See application file for complete search history.

(56) References Cited

U.S. PATENT DOCUMENTS

| | | | |
|---|---|---|---|
| 7,478,129 B1 | 1/2009 | Chemtob | |
| 9,401,937 B1 | 7/2016 | Gottlieb | |
| 2009/0147958 A1* | 6/2009 | Calcaterra | H04L 9/0833 380/260 |
| 2010/0005402 A1* | 1/2010 | George | H04L 51/04 715/758 |
| 2010/0325221 A1* | 12/2010 | Cohen | H04L 65/601 709/206 |
| 2011/0282953 A1 | 11/2011 | Lee et al. | |
| 2014/0068468 A1* | 3/2014 | Yoon | H04L 65/403 715/758 |
| 2016/0191578 A1* | 6/2016 | Kim | H04L 51/04 709/204 |
| 2017/0094019 A1* | 3/2017 | Ahmed | G06Q 50/01 |
| 2017/0237785 A1* | 8/2017 | Peng | H04L 51/04 709/206 |
| 2017/0279743 A1* | 9/2017 | Yang | H04L 12/185 |
| 2018/0034756 A1* | 2/2018 | Allen | H04L 51/04 |
| 2018/0239495 A1* | 8/2018 | Sharifi | G06F 40/10 |

* cited by examiner

*Primary Examiner* — Jeong S Park
(74) *Attorney, Agent, or Firm* — Patterson + Sheridan, LLP (57) ABSTRACT

Techniques are described herein for transmitting subgroup messages and displaying such subgroup messages within a group-based message interface. The subgroup message includes both a message intended for the subgroup and a subgroup command indicating that the message is sent to a subgroup of a group participating in a group-based message interface. The subgroup members are then determined from the subgroup command and the subgroup message is displayed to the subgroup members.

20 Claims, 10 Drawing Sheets

SUBGROUP MESSAGING WITHIN A GROUP-BASED MESSAGING INTERFACE

BACKGROUND

The present disclosure relates to electronic communication systems, and more specifically, to a group message-based communication system that provides a message interface for sending messages to a subgroup of people within a group.

Group-based messaging and chatting is very popular in social network and in messaging based programs. These group-based messaging services can be for both social interaction and for communication in a business or professional setting. Group-based messaging provides a quick and convenient way for multiple people to communicate and keep up to date on the topic being discussed in the messages. However, while group messaging can quickly convey information related to the entire group, other information may only be relevant to certain members of the group. Current solutions require the creation of new groups or message channels in order to provide for group messaging.

SUMMARY

According to one embodiment of the present disclosure, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer program product for group-based messaging, the computer program product including a computer-readable storage medium having computer-readable program code embodied therewith, the computer-readable program code executable by one or more computer processors to perform an operation. The operation including receiving, at a group-based messaging interface server providing message based communication between a plurality of members of a group, a subgroup message including a subgroup command, where the subgroup command indicates the message is sent to a subgroup of the plurality of members of the group, determining, from the subgroup command, a plurality of subgroup members in the subgroup, and displaying, the subgroup message to one or more of the plurality of subgroup members in a message display including both group messages and subgroup messages. Other embodiments of this aspect include corresponding computer systems, apparatus, and computer programs recorded on one or more computer storage devices, each configured to perform the actions of the methods.

In another embodiment, a system for group-based messaging including one or more computer processors, and a memory containing a program which when executed by the processors performs an operation. The operation including receiving, at a group-based messaging interface server providing message based communication between a plurality of members of a group, a subgroup message including a subgroup command, where the subgroup command indicates the message is sent to a subgroup of the plurality of members of the group, determining, from the subgroup command, a plurality of subgroup members in the subgroup, and displaying, the subgroup message to one or more of the plurality of subgroup members in a message display including both group messages and subgroup messages.

One general aspect includes a method for group-based messaging. The method including receiving, at a group-based messaging interface server providing message based communication between a plurality of members of a group, a subgroup message including a subgroup command, where the subgroup command indicates the message is sent to a subgroup of the plurality of members of the group, determining, from the subgroup command, a plurality of subgroup members in the subgroup, and displaying, the subgroup message to one or more of the plurality of subgroup members in a message display including both group messages and subgroup messages. Other embodiments of this aspect include corresponding computer systems, apparatus, and computer programs recorded on one or more computer storage devices, each configured to perform the actions of the methods.

DETAILED DESCRIPTION

Group-based messaging can provide a quick and easy way for information to be shared among a group of people. However, in some cases, the groups of people can become too large for effective communication. This problem becomes more pronounced when side conversations or messages begin in the group messages. This can overwhelm group members with messages that they have no interest in viewing. Receiving multiple messages that do not contain relevant information to the viewer/reader of the message can result in that viewer ignoring the group-based messaging, even when relevant information is sent through the group based messages. Additionally, while beginning new message displays or channels for smaller and smaller portions of the group can result in disjointed communication, where conversations are occurring in multiple message channels and some members of the group are not aware of communications between smaller sets of members of the group, resulting in confusion and inefficiency.

For example, in a work based group chat for a project with fourteen members participating in the group chat, the members of the group chat may include developers, testers, file handlers, and a manager. When different issues, problems, or topics of discussion arise, only a subgroup of the members with certain roles are necessarily included in and/or concerned with the issue. For example, a development issue may only need to be communicated to developers, etc. However, for different issues, a different subgroup and/or combination of subgroups are needed. For example, a testing issue may need to be discussed with both a tester subgroup and a developer subgroup. In some examples, even if the issues are only related to a subgroup the information may still need to be accessible by other group members if they need to view the information. For example, file handlers may not need to view and or be notified when each message concerning the testing issue is sent/received; however, the file handlers may review the messages at the time they are sent/received or at a later time to understand where the group as a whole is at on the project.

The embodiments described herein, provide for subgroup messages to be communicated and displayed in group-based messaging between a plurality of members of a group. For example, subgroup messages can be sent to a subset or selection of group members without bothering or notifying the members of the entire group, thus achieving consistent group communication without causing members to be overload without unrelated messages. As described herein, subgroups can be initiated and terminated according to the needs of the group. In some examples, the subgroup messages can be displayed within a message display in a group-based messaging interface, where the message display includes both group messages and subgroup messages, where the subgroup messages are displayed with an indication the subgroup message is meant for the subgroup members. In another example, the subgroup messages can be displayed within a subsection of a group-based messaging interface, where the subsection is dedicated to display of the subgroup messages.

Figure 1A:
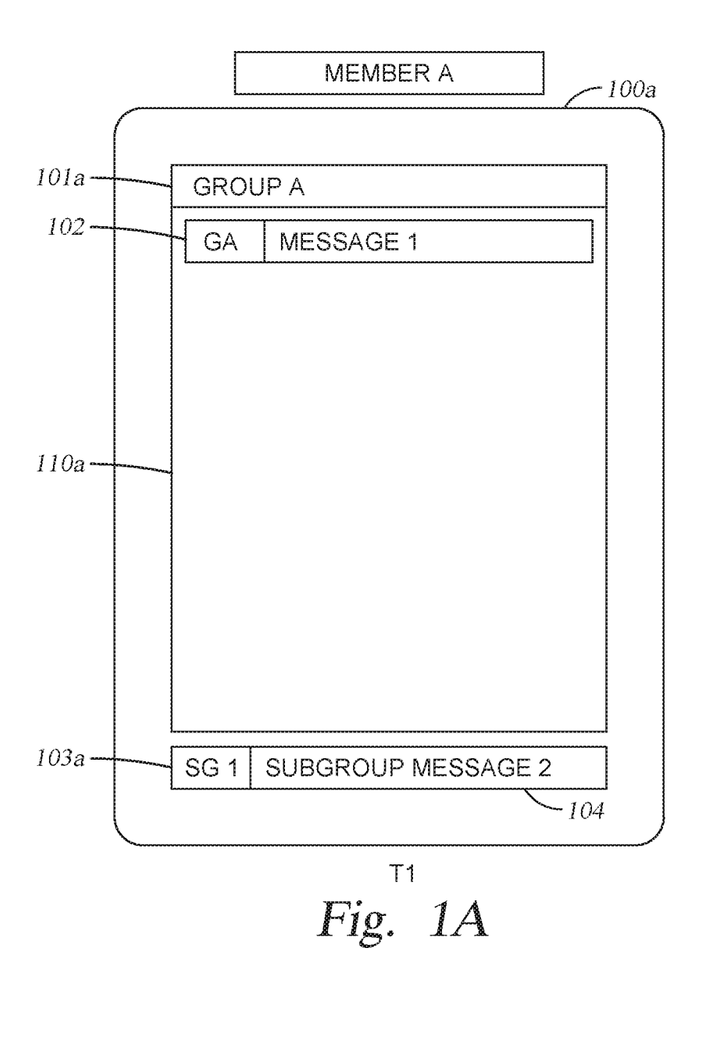
FIGS. 1A and 1B depict a group-based messaging interface for a subgroup member, according to embodiments described herein.
Figure 1B:
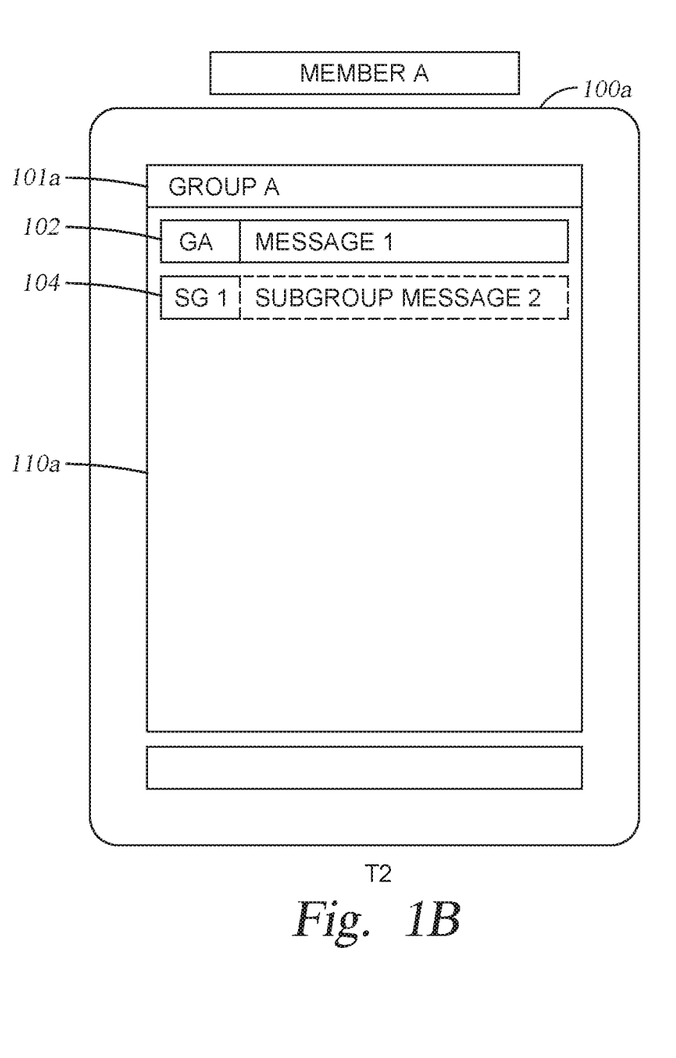

With reference now to FIGS. 1A-1D which depict group-based messaging interfaces for a subgroup member, according to one embodiment. In some examples, the group may consist of several members including Member A, Member B, and Member C among others and is referred to herein as "Group A." For example, the interface 100a shown in FIGS. 1A and 1B is the interface provided to Member A and is in communication a group-based messaging interface server. The interface 100a displays all of the messages sent and received from the group members and appropriate subgroup members as described herein. At a first time T1, as shown in FIG. 1A, the interface 100a includes a group identifier 101a and a group message 102, both displayed on a message display 110a. The message display 110a generally displays the messages sent and received from the group and applicable subgroup messages to Member A.

In some examples, the messages, including both group and subgroup messages, will be displayed in temporal order or order of receipt as shown in FIGS. 1A and 1B. As shown, the group identifier 101a identifies the group as "Group A" (additional examples are discussed in relation to FIG. 4). The group message 102 is also identified as a group level message as also further described in relation to FIG. 4. The interface 100a also includes message input display 103a. As shown in FIG. 1A, Member A has entered a subgroup message 104 to be sent to subgroup 1, which is a subgroup of members of Group A, including at least Member A and Member B, but not including Member C (additional examples of a subgroup messages are discussed on relation to FIGS. 4 and 5). For example, in if Group A is a group focused on a particular project, the subgroup of members may include the developers assigned to the project and not include the testers and file handlers. After the subgroup message 104 has been sent to the subgroup, such as at second time T2, shown in FIG. 1B, the interface 100a now displays the subgroup message 104 within the message display 110a. The subgroup message 104 is identified as a subgroup message as shown in FIG. 1, and as described in more detail in relation to FIGS. 3-5.

Figure 1C:
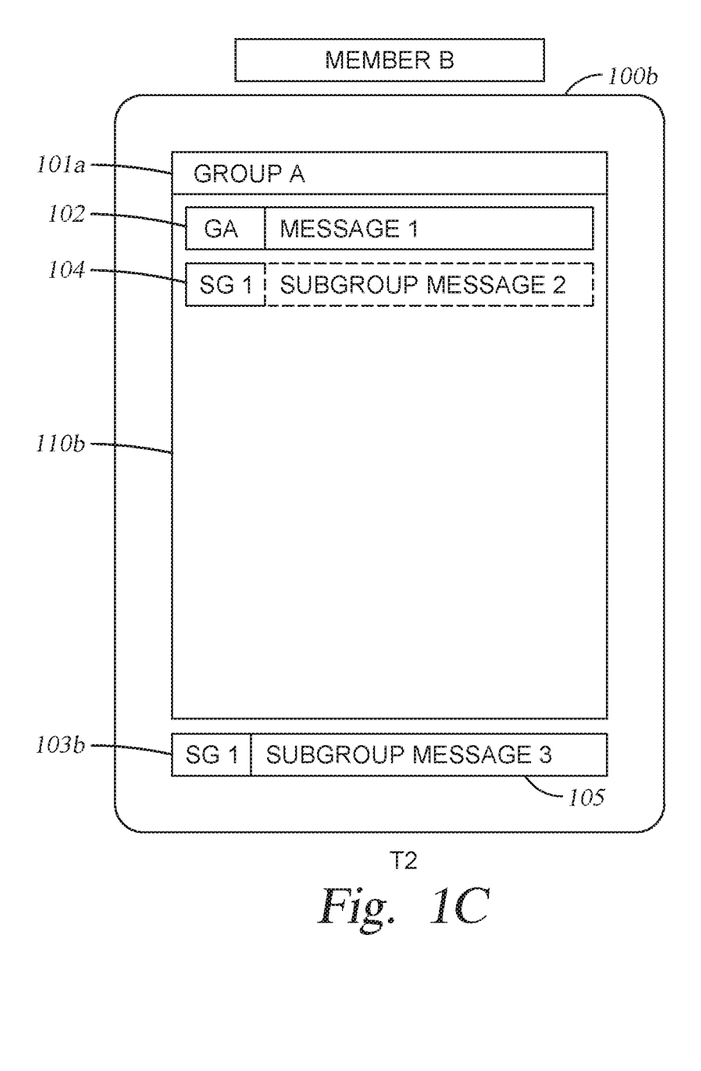
FIGS. 1C and 1D depict a group-based messaging interface for subgroup members, according to embodiments described herein.

As shown FIG. 1C, the interface 100b, which is the interface provided to Member B also displays the subgroup message 104 since Member B is a member of the subgroup 1. In a similar manner to interface 100a, the interface 100b also includes a message display 110b and message input display 103b. At T2, the group message 102 and the subgroup message 104 are each displayed in the message display 110b. The message input display 103b includes a subgroup message 105, entered by Member B to be sent to subgroup 1. After the subgroup message 105 has been sent to the subgroup, such as at third time T3, shown in FIG. 1D, the interface 100a now displays the subgroup message 105 within the message display 110b, along with the previously sent messages including group message 102 and subgroup message 104.

Figure 2A:
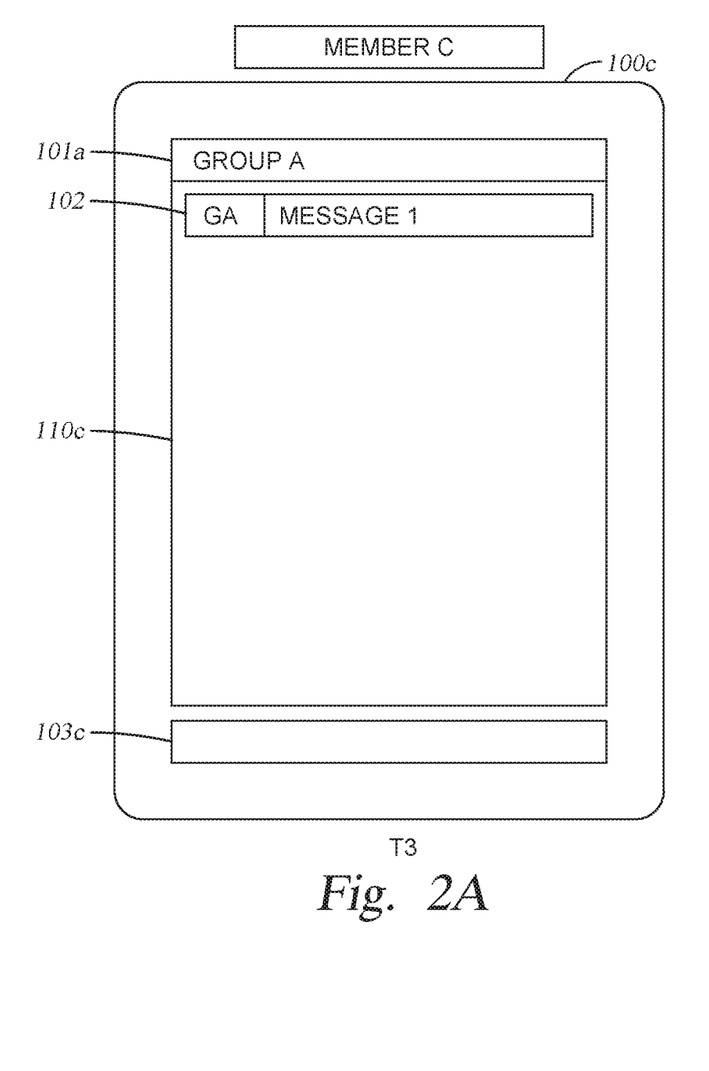
FIGS. 2A and 2B depict a group-based messaging interface for a group member, according to one embodiment described herein.
Figure 2B:
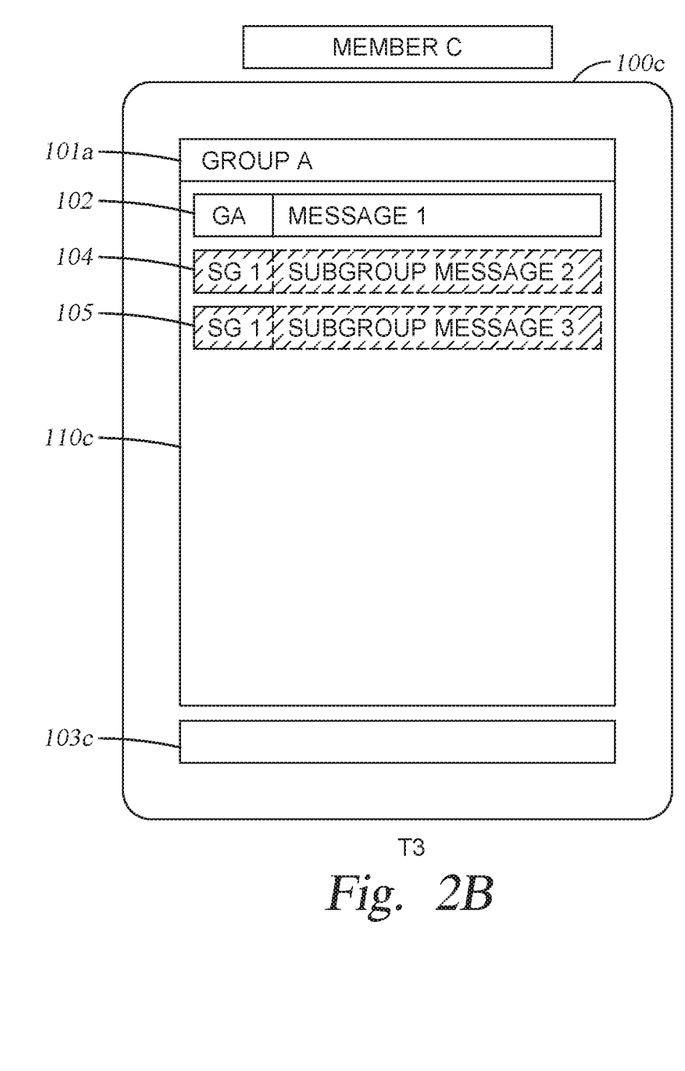

FIGS. 2A and 2B depict a group-based messaging interface for a group member, according to one embodiment described herein. As shown, in FIGS. 2A and 2B, the interface 100c, which is the interface provided to Member C does not clearly display the messages destined for the subgroup 1. For example, in FIG. 2A, at T3, the message display 110c only displays the group message 102. In some examples, the subgroup messages are not presented or displayed in the message display 110c because the subgroup 1 is a private or secured subgroup as described herein. For example, for the group working on the project described herein, some issues may need to be discussed among developers (Members A and B), but kept confidential from the testers (Member C) to avoid contamination of the testing and developing process.

In another example shown in FIG. 2B, the subgroup messages 104 and 105 are partially displayed in the message display 110c. For example, the subgroup messages 104 and 105 may be displayed in such a manner to indicate to the viewer, Member C, that the messages are not intended for the entire group A. This allows Member C to easily ignore the subgroup messages and/or read the subgroup messages if needed. While displayed in FIG. 2B as obscured, the partially displayed messages 104 and 105 may be partially displayed in a number of ways, including minimized within the message display 110c, shown with a different border or highlight around the subgroup messages versus the group messages, shown only as a message placeholder without the message contents being displayed, etc.

Figure 3A:
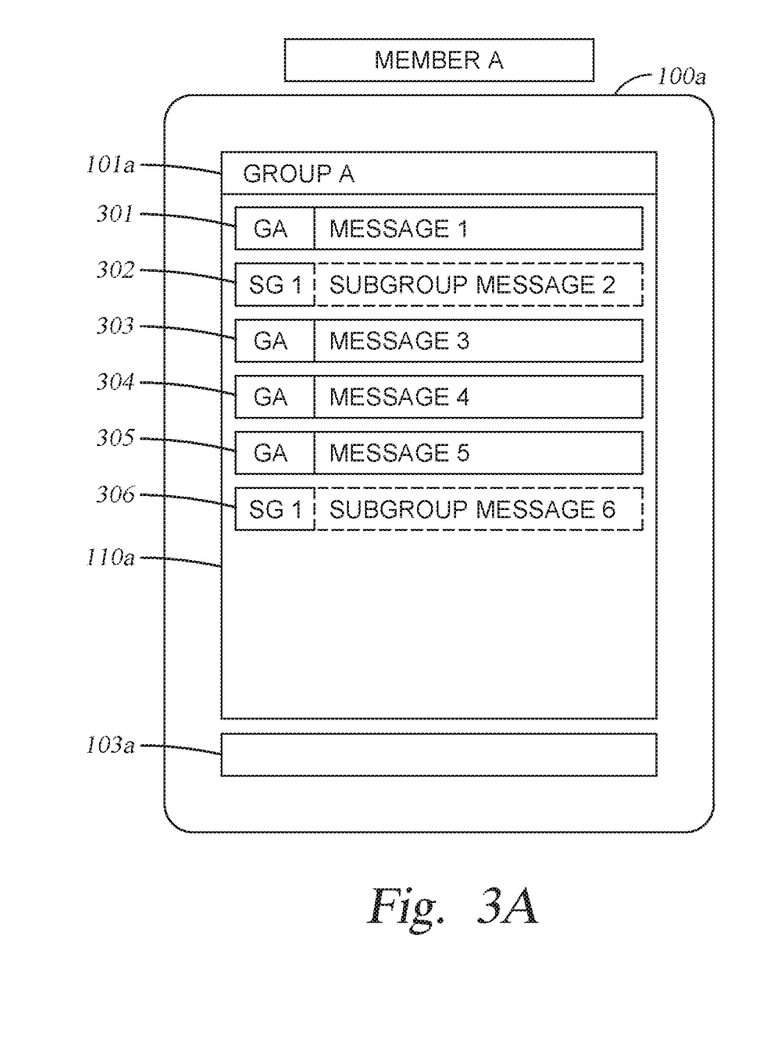
FIGS. 3A and 3B depict message order for a group-based messaging interface, according to embodiments described herein.
Figure 3B:
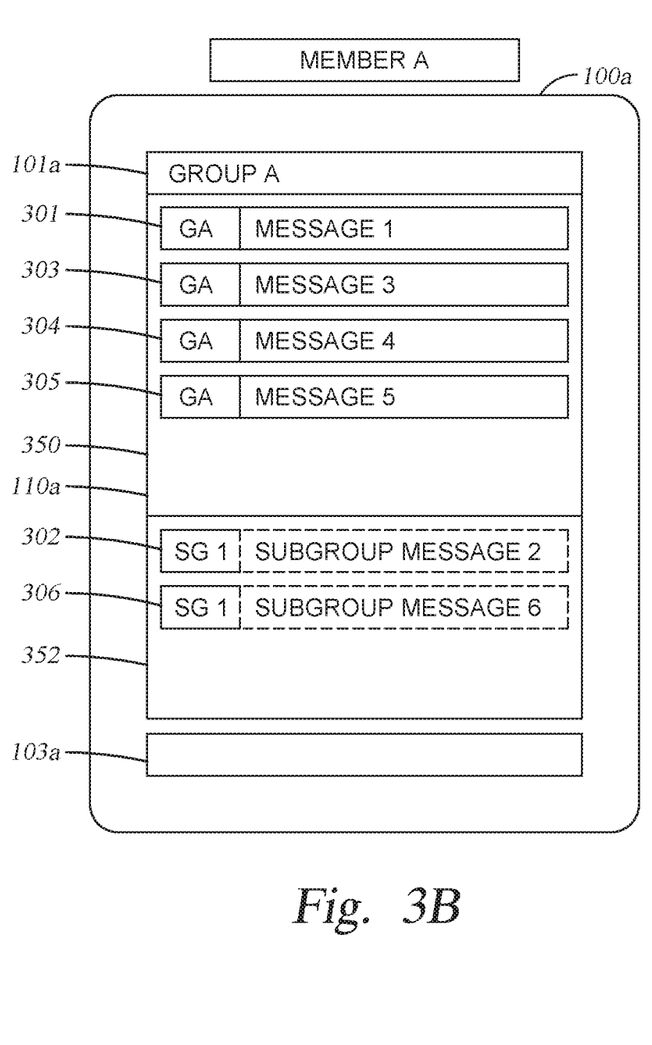

FIGS. 3A and 3B depict message order for a group-based messaging interface, according to embodiments described herein. For example, as shown in FIG. 3A, the message for both Group A and subgroup 1, may be displayed in temporal order. For example, as each message including the group and subgroup messages are displayed in the interface, such as interface 100a, the messages will be displayed in the order of receipt. As shown, the order or receipt of the messages at the interface 100a in FIG. 3a is 1) group message 301, 2) subgroup message 302, 3) group messages 303, 4) group message 304, 5) group message 305, and 5) subgroup message 306. While shown in descending order in FIG. 3A, the messages may also been shown in ascending order and/or other arrangements based on a time of receipt at the interface 100a.

In another example, as shown in FIG. 3B, the interface 100a renders or otherwise displays a subsection message display 352 for the subgroup messages.

The interface 100a then displays the messages in temporal order within each subsection. For example, the subgroup messages 302 and 306 are shown in the order of receipt related to the subgroup messages and the group messages 301, 303, 304, and 305 are shown in the order of receipt in relation to the group messages. The subsection allows for a viewer of the messages to immediately recognize the different message groups and to distinguish between the conversation occurring between the members of the group and the conversation occurring between the members of the subgroup. In some examples, the members of the group who are not members of the subgroup will not have the subsection rendered on their display, such that the subgroup messages are not displayed, such as discussed in relation to FIG. 2A. In another example, the subsection may be rendered and the messages partially displayed within the subsection as discussed in relation to FIG. 2B.

Figure 4:
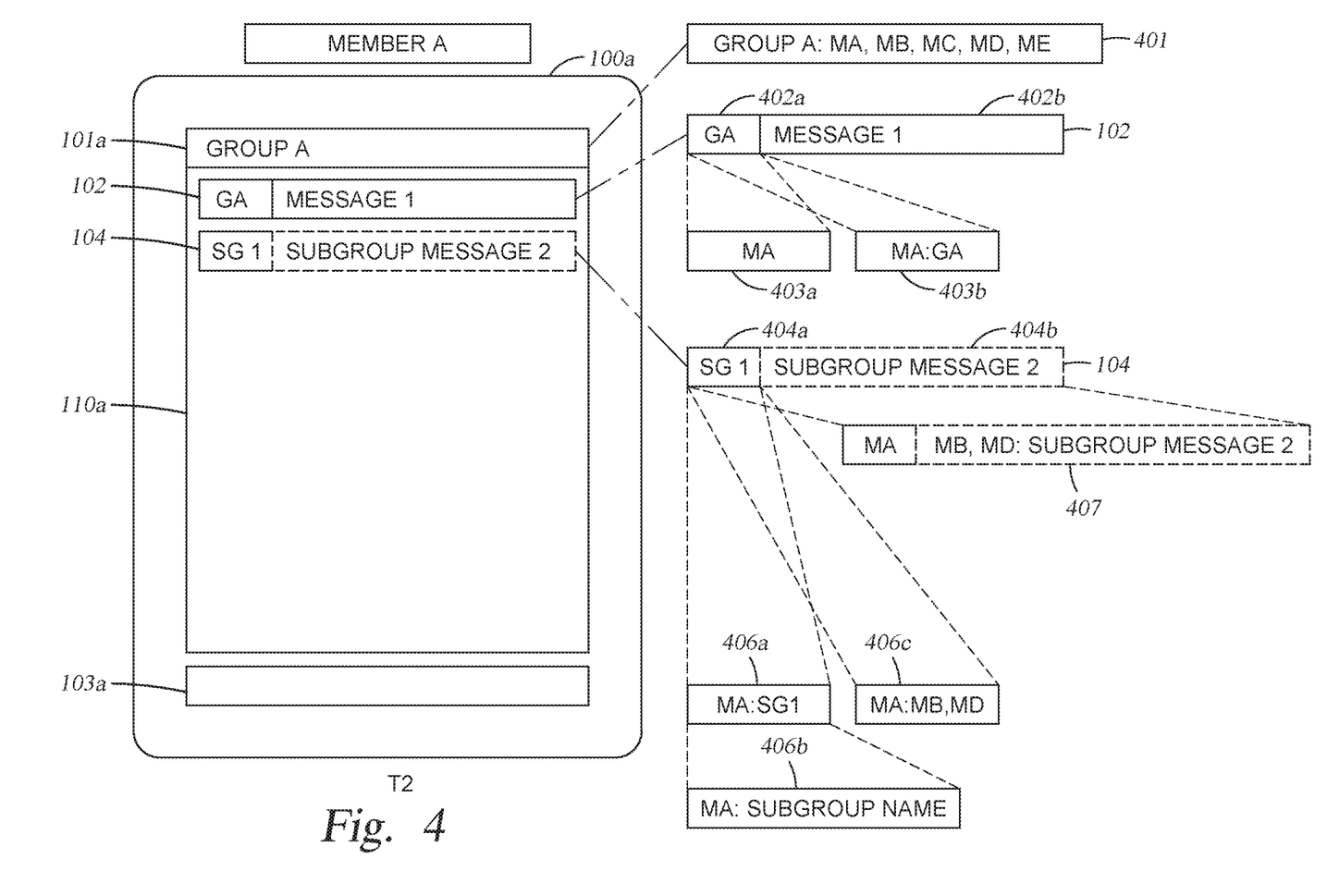
FIG. 4 depicts message display embodiments in a group-based messaging interface, according to embodiments described herein.

FIG. 4 depicts message display embodiments in a group-based messaging interface, according to embodiments described herein. As discussed in relation to FIGS. 1A-1D, the interface 100a includes, at T2, the group identifier 101a and the group message 102, and the subgroup message 104. As shown in FIG. 4, the group identifier 101a may be formatted to include identifying information about the group. For example, the name of the group "Group A" may displayed. In another example, such as shown in the group identifier 401, the individual members of the group may be identified and/or displayed. For example, for a group including Member A-E, the group identifier 401a may display the member's names and/or aliases for the members, such as "MA, MB, MC, MD, ME," etc.

As also shown in FIG. 4, the group message 102 includes a message identifier 402a and the message body 402b. In some examples, the message body 402b includes the contents of the message (e.g., text and/or media content). As shown, the message identifier 402a may include a message origin, such as shown in message identifier 403a, which indicates the message was sent from Member A. In another example, the message identifier 402a may include a message origin and a message destination as shown in as shown in message identifier 403b, which indicates the message was sent from Member A to Group A. This allows for message viewers to quickly identify and differentiate between group messages and subgroup messages as well as identify the sender of the message.

Similarly, the subgroup message 104 also includes a message identifier 404a and a message body 404b. As shown, the message identifier 404a may include a message origin and subgroup designation, such as shown in message identifier 406a, which indicates the message was sent from Member A to the subgroup 1. In another example, the message identifier 404a may include a message origin and subgroup designation including the subgroup name as set by a subgroup administrator and/or the subgroup members, such as shown in message identifier 406b, which also indicates the message was sent from Member A to the subgroup 1. In another example, the message identifier 404a may include a message origin and a message destination, with the subgroup members identified, as shown in message identifier 406c, which indicates the message was sent from Member A to Members B and D. In another example, the message identifier 404a may only include a message origin and the message body may indicate the destination as shown in the subgroup message 407. In this example, the message contents in the message body indicate that the message is sent to the subgroup 1 and/or subgroup members A, B, and D.

Figure 5:
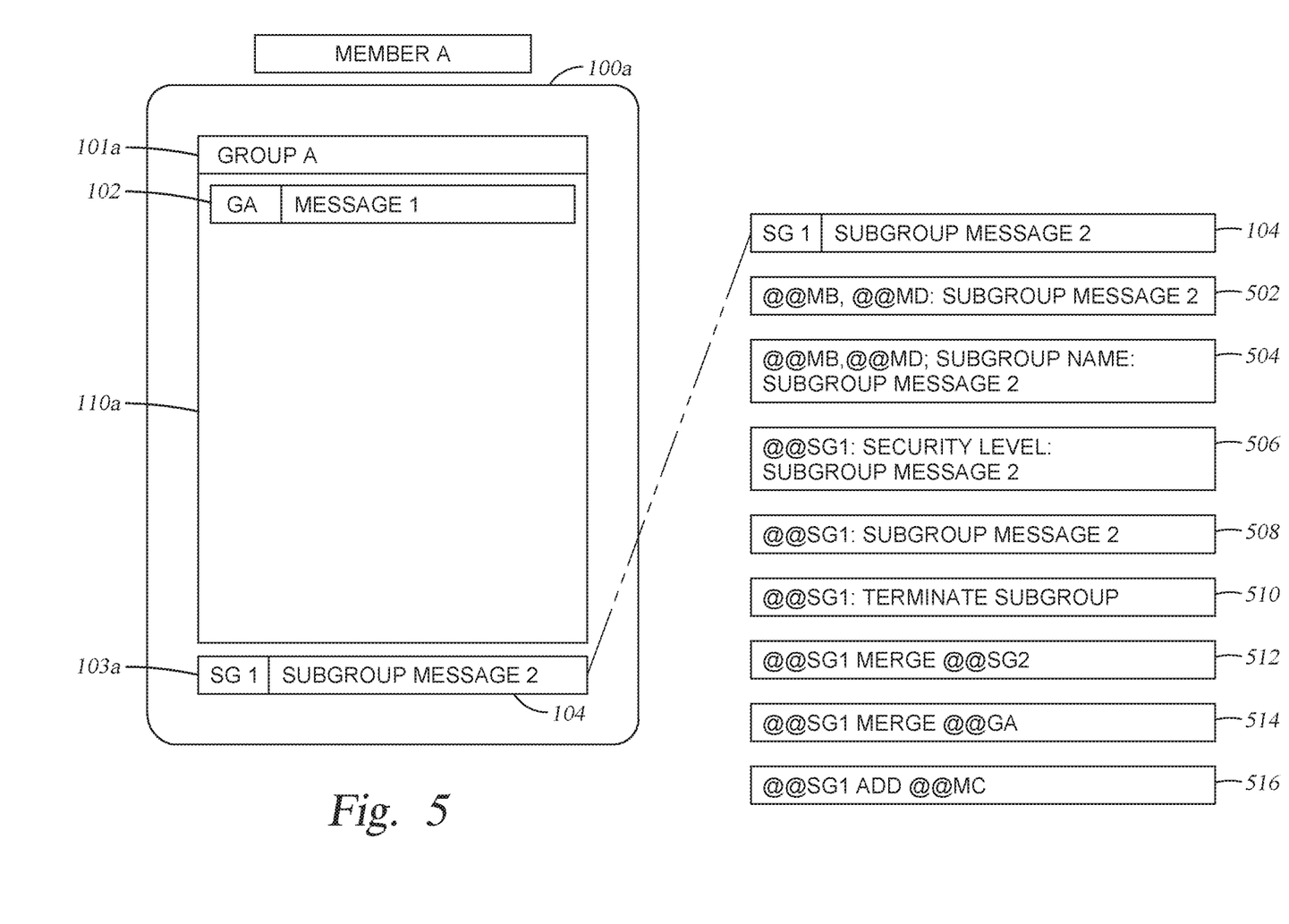
FIG. 5 depicts message composition embodiments in a group-based messaging interface, according to embodiments described herein.

FIG. 5 depicts message composition embodiments in a group-based messaging interface, according to embodiments described herein. As discussed in relation to FIGS. 1A-1D, the interface 100a displays, the group identifier 101a and the group message 102, and the subgroup message 104 shown in the message input display 103a. While shown as the subgroup message 104 in FIG. 5, the subgroup messages illustrated may be a subgroup message sent at any time using the group-based messaging. As shown in FIG. 5, the subgroup message 104 may be composed/formatted to execute subgroup commands. As shown in compositions 502-516, there are several ways to compose the subgroup message 104. In composition 502, the input received from the Member A includes a first portion identifying subgroup members (@@MB, @@MD) and a second portion which includes the message body (e.g., message content such as text and other media). Composition 504, illustrates a command to add identifying information to the subgroup such as subgroup name and/or a subgroup topic. In this example, the input includes a first portion which identifies subgroup members (@@MB, @@MD) and a subgroup name/topic (e.g., "Subgroup 1," "Project Team," "etc.). In some examples, the subgroup command may only include a subgroup topic or the subgroup such that any member of the group associated with the topic is automatically included in the subgroup. For example, if the subgroup topic is "developers," upon initiation of the subgroup, any member of the group that is identified as a "developer" and/or subscribed as a "developer" will automatically be included in the subgroup and receive the subgroup messages.

In another example, the composition 506 includes a subgroup command to add a security or privacy level to the subgroup messages. For example, the first portion may include and identification of the group and the desired security level "@@SG1; Security Level." The security level then provides that only members of the subgroup view the subgroup message. In another example, the security level includes limits on which members can add or invite other group members to the subgroup. For example, the limit on which members can be invited may be restricted until the members of the subgroup agree to add another member to the subgroup. Additionally, in some examples, other subgroup parameters/commands may be edited by subgroup members according to the needs of the subgroup. In some examples, the subgroup parameters/commands by be displayed/communicated to the subgroup members as a warning message when the subgroup is created. For example, if a security level is active for the subgroup, a message is displayed to the subgroup members informing the subgroup members of the security level.

The composition 508 includes a subgroup command to send a subsequent subgroup message to an established subgroup. For example, if subgroup 1 is established and has a name/topic already associated with the subgroup, the first portion of composition 508 may include just an identification of the subgroup group "@@SG1."

In another example, composition 510 includes a terminate subgroup command. In some examples, the termination command may be an instruction to terminate the subgroup immediately. In another example, the terminate subgroup command may include termination parameters which dictate when the subgroup will terminate (e.g., within a certain period of time of the subgroup initiation, after a period of no messages sent to the subgroup, etc.) In some examples, the termination of the subgroup archives and/or deletes the subgroup messages from the various interfaces. In another example, the termination of the subgroup merges the subgroup messages into the group messages, such that subgroup messages now appear as group messages.

Compositions 512 and 514 include merge subgroup commands. In composition 512 the command includes a merge of the subgroup 1 with another subgroup, subgroup 2, merges the subgroup messages of subgroup 2 into the subgroup messages of subgroup 1, such that subgroup 2 messages now appear as subgroup 1 messages. In composition 514, the merge command includes a merge of the subgroup 1 with the group a, which merges the subgroup messages into the group messages, such that subgroup messages now appear as group messages. In another example, composition 516 includes an add member command, which adds a member of the group to the subgroup 1. In some examples, the add member command, the merge commands, the terminate commands, and the security level commands may only be used by a subgroup initiator and/or administrator.

Figure 6:
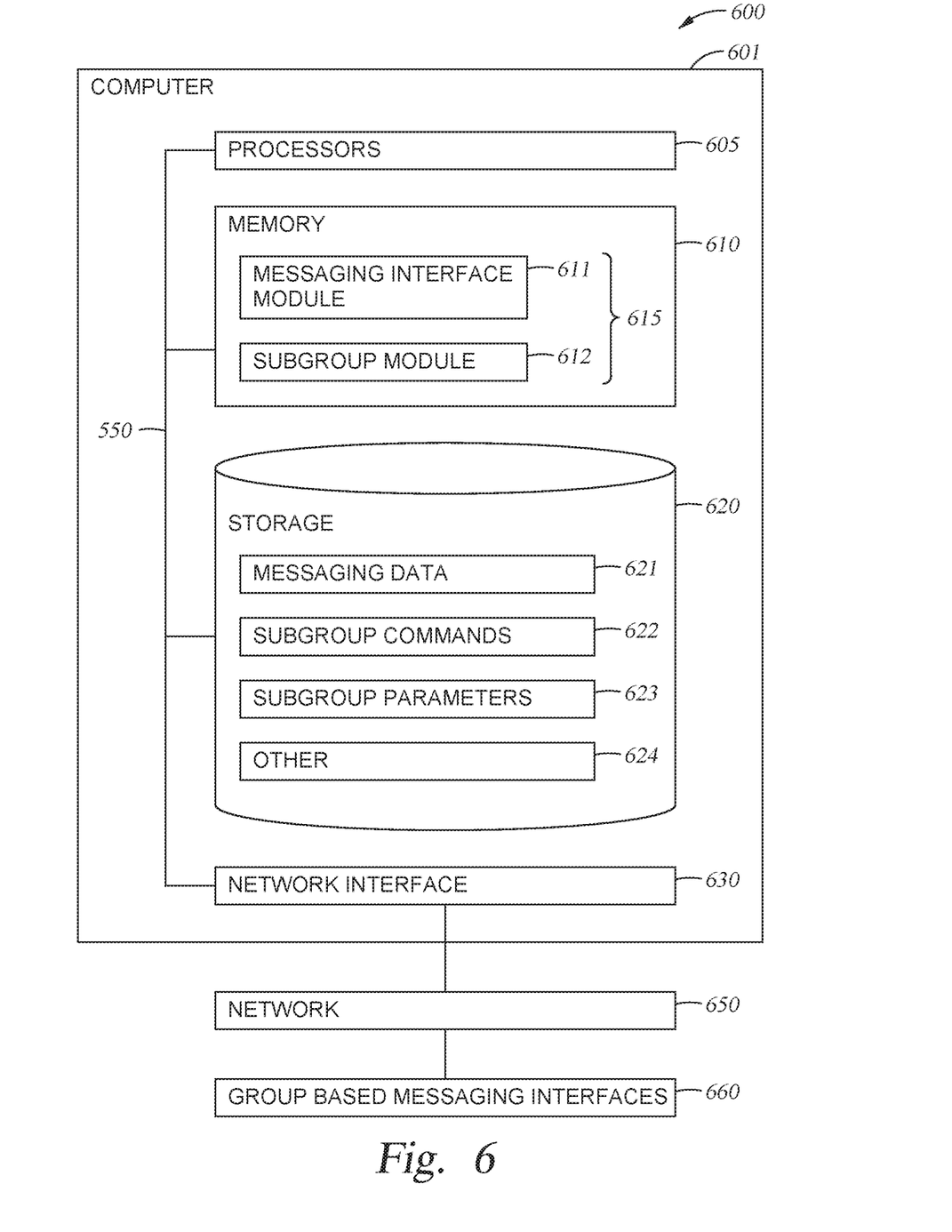
FIG. 6 is a block diagram of a device for group-based messaging, according to one embodiment described herein.

Turning now to FIG. 6 which depicts a device for group-based messaging, according to one embodiment described herein. FIG. 6 is a block diagram of a server to facilitate group-based messaging, according to one embodiment. As shown in FIG. 6, the arrangement 600 may include server 601 configured to execute the various functions of the interfaces described herein. The server 601 is shown in the form of a general-purpose computing device. The components of server 601 may include, but are not limited to, one or more processors (or processing units) 605, a system memory 610, a storage system 620, network interface 630 connecting the server 601 to network 655 and, in turn, other group-based messaging interfaces 660, and a bus 650 that couples various system components including the system memory 610 and storage system 620 to processors 605 along with various input/output components In other embodiments, arrangement 600 is distributed and includes a plurality of discrete computing devices that are connected through wired or wireless networking. In some examples, the messaging interfaces are distributed interfaces on clients devices of the group members and associated with distinct users and can include interface instances controlled by the server 601 and hosted on a web service, such as an internet browser, a dedicated application on a mobile device or computer, etc.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Server 601 typically includes a variety of computer system readable media. Such media may be any available media that is accessible by server 601, and it includes both volatile and non-volatile media, removable and non-removable media.

System memory 610 can include computer system readable media in the form of volatile memory, such as random access memory (RAM) and/or cache memory. Server 601 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

Server 601 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. Storage 620 may include media for storing messaging data 621, subgroup commands 622, subgroup parameters 623, and other information 624 stored for access and use by the server 601.

Memory 610 may include a plurality of modules 615 for performing various functions described herein. The modules 615 generally include program code that is executable by one or more of the processors 605. As shown, modules 615 include messaging interface module 611 and subgroup module 612. The modules 615 may also interact with each other and storage system 620 to perform certain functions as described herein.

Figure 7:
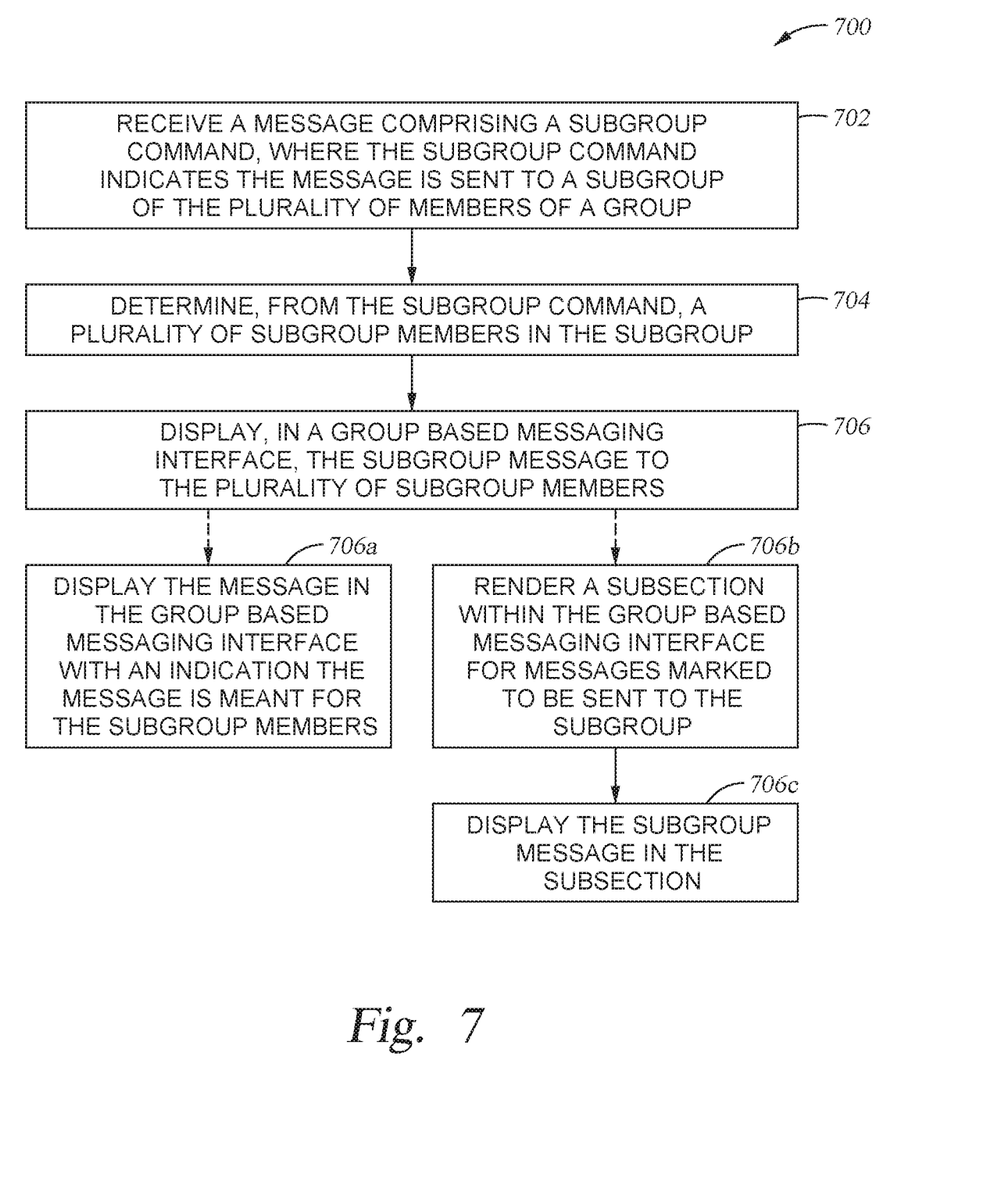
FIGS. 7-10 illustrate methods for group-based messaging, according to embodiments described herein.

FIG. 7 illustrates a method for group-based messaging, according to embodiments described herein. Method 700 begins at block 702, where, a group-based messaging interface server providing message based communication between a plurality of members of a group, such as described in relation to FIG. 6, embodied as a the server 601, including the messaging interface module 611 and subgroup module 612, receives a subgroup message comprising a subgroup command, where the subgroup command indicates the message is sent to a subgroup of the plurality of members of the group. For example as described in FIGS. 1A and B, the messaging interface module 611 receives the subgroup message 104 composed and sent from the Member A using the interface 100a. In one example, the interface 100a may be located on a remote device, such as Member A's mobile device. In some examples, Member A may input the subgroup message into an existing group message interface instance, where one or more group messages have been sent/received from members of the group. For example, as shown in FIG. 1A, the Group A has sent/received at least group message 102 as shown in the interface 100a.

At block 704, the subgroup module 612, determines, from the subgroup command, a plurality of subgroup members in the subgroup. If this is a first message sent to the members of the subgroup, the subgroup module 612 initiates a subgroup and assigns a generic identifier, such as subgroup 1 (SG1) to the subgroup. Additionally, the subgroup module 612 assigns Member A as the administrator of the SG1, since Member A initiated the subgroup. Member A can then add more administrators to the subgroup or reassign the administrator role to another member through a subgroup command. In one example, the subgroup command comprises the composition 502, where the message received from the Member A includes a first portion identifying the subgroup members, Member B and Member D (@@MB, @@MD). In another example, the subgroup command comprises the composition 504, which can include both the identification of the subgroup members and a subgroup name and/or subgroup topic. In this example, the subgroup name and/or topic is used to identify members of the group that are subscribed to the subgroup either by the name or by the topic of the subgroup. For example, if Members A, B, and D are coworkers working on a specific portion of a group project (e.g., developers), the specific portion of the group project can be used as the name and/or topic of the subgroup, such that subgroup messages can be sent to the subgroup concerning that topic. If the subgroup has a generic identifier, the generic identifier is updated and/or replaced with the subgroup name and/or subgroup topic.

In another example, the subgroup command comprises the composition 506, including a security level. In some examples, the security level indicates the subgroup message is to be viewed by only the plurality of members of the subgroup. For example, if Members A, B, and D desire to keep the messages about the specific portion of the group project confidential, the messages will only be displayed to the Members A, B, and D. In some examples, the security level also prevents subgroup messages from being merged back into the group messages and/or to into messages of another subgroup.

Figure 1D:
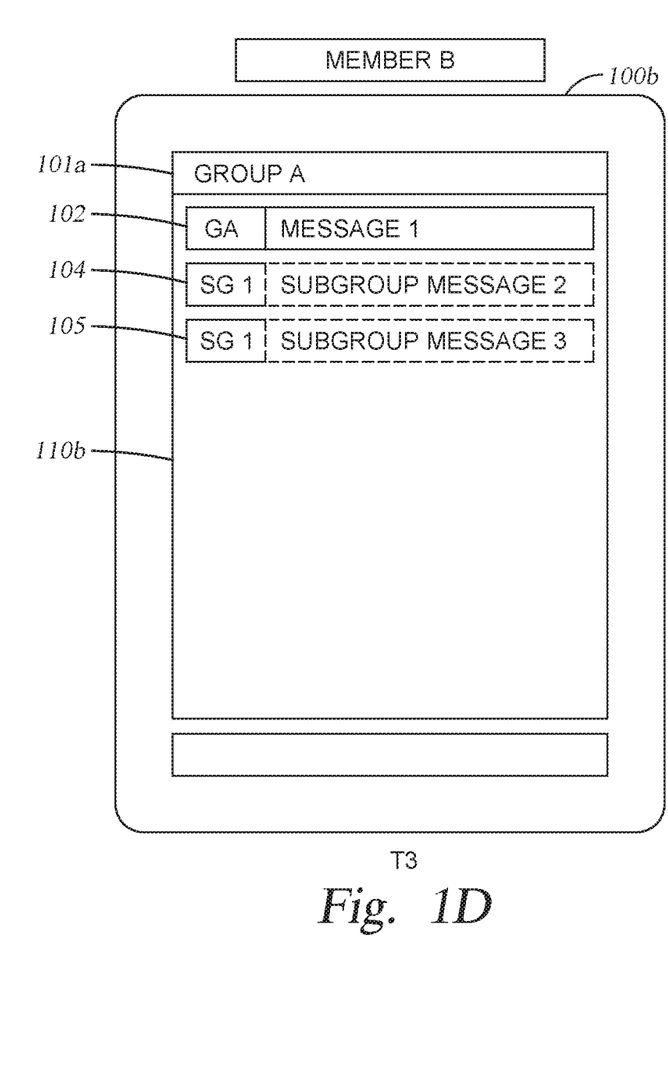

At block 706, the messaging interface module 611 and subgroup module 612, display the subgroup message to one or more of the plurality of subgroup members in a message display comprising both group messages and subgroup messages. In some examples, the subgroup message is output for display to the client devices of the plurality of subgroup members. For example, as shown in FIGS. 1B, 1C, and 1D, the subgroup message 104 and the subgroup message 105 are displayed in the interfaces 100a and 100b since both Member A and Member B are members of the subgroup. In some examples, such as shown in FIG. 3A, the subgroup messages are displayed with group messages. In some examples, at block 706a, the messaging interface module 611 and subgroup module 612 causes the displays the subgroup message with an indication the subgroup message is meant for the subgroup members. For example, as described herein, the message may include a subgroup indication such as a subgroup identifier, highlight, or other indication that the message is intended for the subgroup members. In one example, the subgroup message may also be displayed in a message display of a member of the group who is not a member of the subgroup, such as described in FIGS. 2A and 2B. In this example, the subgroup message, such the subgroup messages 104 and 105 in FIGS. 2A and 2B, is partially displayed in the message display 110c. For example, the subgroup message 104 is displayed in such a manner to indicate to the viewer, Member C, that the messages are not intended for the entire group A.

In another example, at block 706b, the messaging interface module 611 outputs a renderable object, (e.g., a display command) to the to one or more of the plurality of subgroup members' client devices which renders a subsection within the message display for subgroup messages. For example, as shown in FIG. 3B, the messaging interface module 611 may initiate a renderable object which renders the subsection message display 352 such that subgroup messages can be displayed in the subsection message display. In some examples, the subsection may be rendered upon initiation of the subgroup. In another example, the subsection may be rendered upon receiving a subsection subgroup command. At block 706c, the messaging interface module 611 causes the display of the subgroup message in the subsections. For examples, the subgroup message 302 and 306 are displayed in the subsection 352 shown in FIG. 3B.

Figure 8:
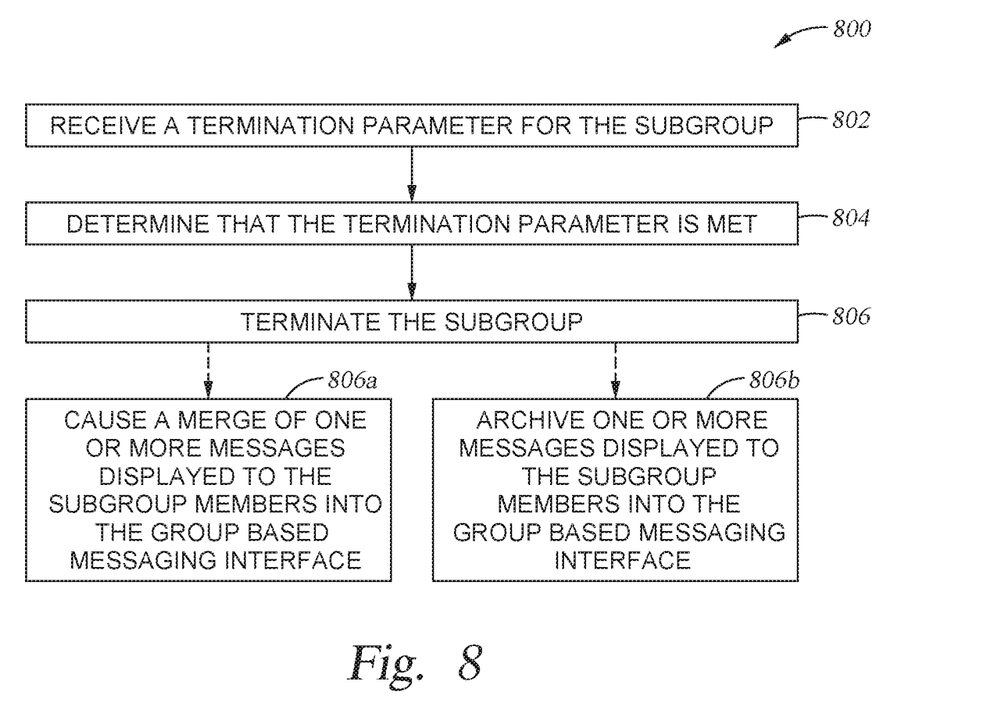

FIG. 8 illustrates a method for terminating a subgroup, according to embodiments described herein. Method 800 begins at block 802, where the server 601, including the messaging interface module 611 and subgroup module 612, receives a termination parameter for the subgroup, wherein the termination parameter indicates the subgroup will terminate after the termination parameter is met. For example, as shown in FIG. 5, a termination command may be received which includes an instruction/parameter to terminate the subgroup immediately. In this example, the subgroup will be immediately terminated as described herein. In another example, the terminate subgroup command may include termination parameters which dictate when the subgroup will terminate (e.g., within a certain period of time of the subgroup initiation, after a period of no messages sent to the subgroup, etc.).

At block 804, the subgroup module 612, determines that the termination parameter is met. For example, if no message has been sent or received within a period of time set in the termination parameters, the subgroup module 612 determines that the parameter has been met. At block 806, the messaging interface module 611 and subgroup module 612 terminate the subgroup. In some examples, this includes at block 806a, causing the merger of one or more subgroup messages displayed to the subgroup members into group messages in the message display. For example, if one or more subgroup messages are marked with an indication they are subgroup messages and/or are displayed in a subsection of a message display, the messages are merged into the group messages such that they appear as group messages.

In another example, at block 806b, the messaging interface module 611 and subgroup module 612 terminate the subgroup by archiving one or more subgroup messages displayed to the subgroup members into the group-based messaging interface In this example, archiving includes causing the messages to be removed from a message display and deleting the messages and/or storing the messages, such as in messaging data 621. For example, if the subgroup is a confidential subgroup and/or has a security level associated with the subgroup, the subgroup messages are not merged into the group messages.

Figure 9:
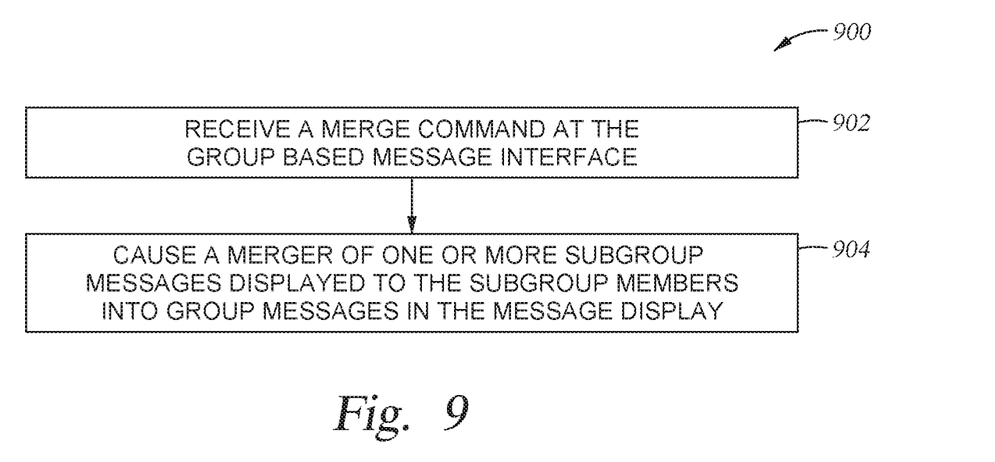

FIG. 9 illustrates a method for merging a subgroup, according to embodiments described herein. Method 900 begins at block 902, where the server 601, including the messaging interface module 611 and subgroup module 612, receives a merge command. For example, as shown in FIG. 5, the server 601 may receive composition 514, where the merge command includes a merge of the subgroup 1 with the group A, which merges the subgroup messages into the group messages, such that subgroup messages now appear as group messages. At block 904, the messaging interface module 611 causes the merger of one or more subgroup messages displayed to the subgroup members into group messages in the message display. In another example, the merge command may combine two subgroups, where the messaging interface module 611 merges the messages of a first subgroup with the messages of a second subgroup as described in relation to FIG. 5.

Figure 10:
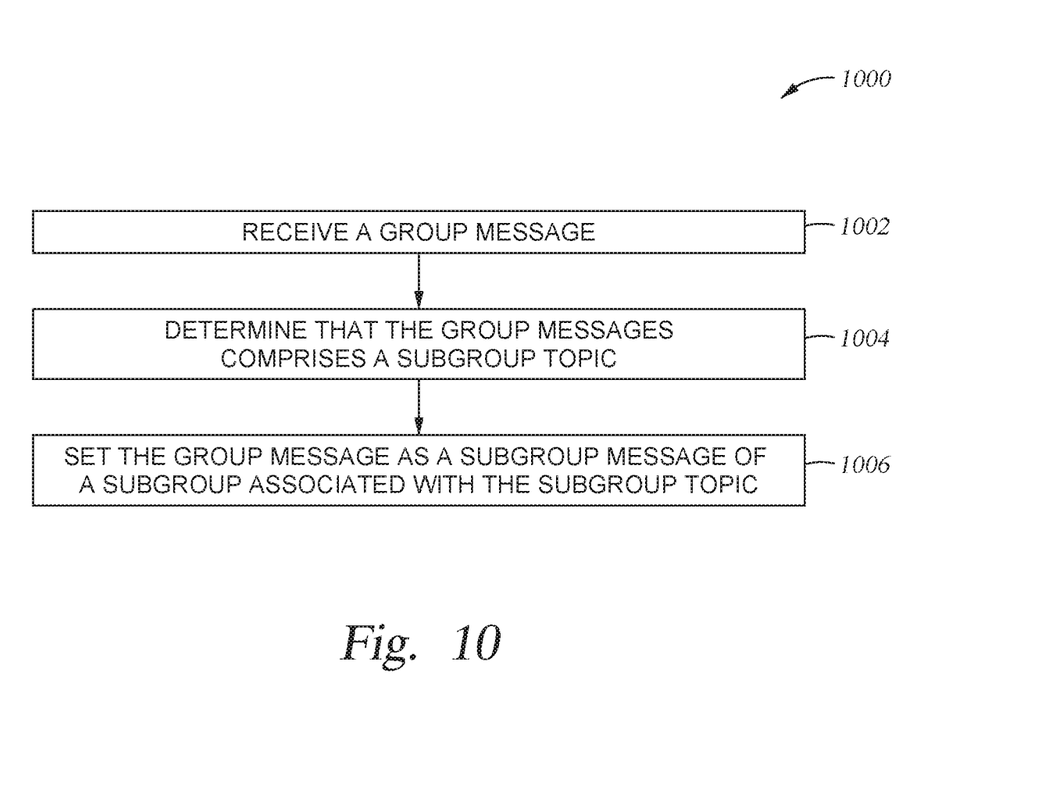

FIG. 10 illustrates a method for group-based messaging. In this example, a group based message may be received without including a subgroup command. However, the server 601 may still determine that the message is a subgroup message. For example, if a developer sends a message that includes a developer related topic in the message body, the subgroup module 612 may determine that the message is meant only for a developer subgroup. Method 1000, begins at block 1002, where the server 601, including the messaging interface module 611 and subgroup module 612 receives a group message and determining that the group messages comprises a subgroup topic (e.g., in the body of the message) at block 1004. Method 1000 continues at block 1006 where subgroup module 612, sets the group message as a subgroup message of a subgroup associated with the subgroup topic. The subgroup message is then handled as a subgroup message by the server 601 as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., modules 611 and 612) or related data available in the cloud. For example, the subgroup module 612 could execute on a computing system in the cloud and perform the subgroup related messaging functions as described herein. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer program product for group-based messaging, the computer program product comprising:
a non-transitory computer-readable storage medium having computer-readable program code embodied therewith, the computer-readable program code executable by one or more computer processors to perform an operation, the operation comprising:
receiving, at a group-based messaging interface server providing message based communication between a plurality of group members, a subgroup message comprising a subgroup command, where the subgroup command indicates the subgroup message is sent to a subgroup of the plurality of group members;
determining, from the subgroup command, a plurality of subgroup members in the subgroup;
outputting the subgroup message for display, to at least one client device associated with a least one member of the plurality of group members,
wherein the subgroup message is displayed in a message display of the at least one client device,
wherein the message display comprises both group messages and subgroup messages,
wherein the subgroup message is displayed with an indication that the subgroup message is meant for the subgroup members when the message display is associated with a subgroup member, and
wherein the subgroup message is obscured to not display message contents when the message display is not associated with the subgroup member;
determining that a termination parameter associated with the subgroup is met; and
terminating the subgroup by merging one or more subgroup messages into group messages in the message display wherein merging the one or more subgroup messages comprises:
removing indications the one or more subgroup messages are meant for the subgroup members,
wherein the one or more subgroup messages and group messages are displayed together based on a time of receipt, wherein indications that the one or more subgroup message are meant for the subgroup members are removed when the message display is associated with the subgroup member, and wherein the one or more subgroup messages and group messages are displayed in ascending order based on a time of receipt, wherein the one or more subgroup messages are unobscured when the message display is not associated with the subgroup member.

2. The computer program product of claim 1, wherein the subgroup message is displayed with an indication the subgroup message is meant for the subgroup members.

3. The computer program product of claim 1, wherein outputting the subgroup message for display comprises:
outputting a renderable object to the at least one client device, wherein the renderable object renders a subsection within the message display for subgroup messages, and wherein the renderable object displays the subgroup message in the subsection.

4. The computer program product of claim 1, wherein the subgroup command further comprises a security setting, wherein the security setting indicates the subgroup message is to be viewed by only the plurality of members of the subgroup, and wherein outputting the subgroup message for display comprises displaying the subgroup message to only the one or more of the plurality of subgroup members in the message display.

5. The computer program product of claim 1, the operation further comprising:
receiving a termination parameter for the subgroup, wherein the termination parameter indicates the subgroup will terminate after the termination parameter is met;
determining that the termination parameter is met; and
terminating the subgroup.

6. The computer program product of claim 5, wherein terminating the subgroup comprises:
causing a merger of one or more subgroup messages displayed to the subgroup members into group messages in the message display.

7. The computer program product of claim 5, wherein terminating the subgroup comprises:
archiving one or more subgroup messages displayed to the subgroup members.

8. The computer program product of claim 1, wherein the operation further comprises:
receiving a merge command at the group based messaging interface; and
causing a merger of one or more subgroup messages displayed to the subgroup members into group messages in the message display.

9. The computer program product of claim 1, wherein the subgroup command further comprises a subgroup topic, wherein the plurality of members of the subgroup are subscribed to the subgroup topic.

10. The computer program product of claim 1, wherein the operation further comprises:
receiving a group message;
determining that the group message comprises a subgroup topic; and
setting the group message as a subgroup message of a subgroup associated with the subgroup topic.

11. A system for group-based messaging comprising:
one or more computer processors; and
a memory containing a program which when executed by the processors performs an operation comprising:
receiving, at a group-based messaging interface server providing message based communication between a plurality of group members, a subgroup message comprising a subgroup command, where the subgroup command indicates the subgroup message is sent to a subgroup of the plurality of group members;
determining, from the subgroup command, a plurality of subgroup members in the subgroup;
outputting the subgroup message for display, to at least one client device associated with a least one member of the plurality of group members,
wherein the subgroup message is displayed in a message display of the at least one client device,
wherein the message display comprises both group messages and subgroup messages,
wherein the subgroup message is displayed with an indication that the subgroup message is meant for the subgroup members when the message display is associated with a subgroup member, and
wherein the subgroup message is obscured to not display message contents when the message display is not associated with the subgroup member;
determining that a termination parameter associated with the subgroup is met; and
terminating the subgroup by merging one or more subgroup messages into group messages in the message display wherein merging the one or more subgroup messages comprises:
removing indications the one or more subgroup messages are meant for the subgroup members
wherein the one or more subgroup messages and group messages are displayed together based on a time of receipt, wherein indications that the one or more subgroup message are meant for the subgroup members are removed when the message display is associated with the subgroup member, and
wherein the one or more subgroup messages and group messages are displayed in ascending order based on a time of receipt, wherein the one or more subgroup messages are unobscured when the message display is not associated with the subgroup member.

12. The system of claim 11, wherein the subgroup message is displayed with an indication the subgroup message is meant for the subgroup members.

13. The system of claim 11, wherein outputting the subgroup message for display comprises:
outputting a renderable object to the at least one client device, wherein the renderable object renders a subsection within the message display for subgroup messages, and wherein the subgroup message is displayed in the subsection.

14. The system of claim 11, wherein the subgroup command further comprises a security setting, wherein the security setting indicates the subgroup message is to be viewed by only the plurality of members of the subgroup, and wherein outputting the subgroup message for display comprises displaying the subgroup message to only the one or more of the plurality of subgroup members in the message display.

15. The system of claim 11, the operation further comprising:
receiving a termination parameter for the subgroup, wherein the termination parameter indicates the subgroup will terminate after the termination parameter is met;

determining that the termination parameter is met; and
terminating the subgroup.

16. A method for group-based messaging comprising:
receiving, at a group-based messaging interface server providing message based communication between a plurality of group members, a subgroup message comprising a subgroup command, where the subgroup command indicates the subgroup message is sent to a subgroup of the plurality of group members;
determining, from the subgroup command, a plurality of subgroup members in the subgroup;
outputting the subgroup message for display, to at least one client device associated with a least one member of the plurality of group members,
wherein the subgroup message is displayed in a message display of the at least one client device,
wherein the message display comprises both group messages and subgroup messages,
wherein the subgroup message is displayed with an indication that the subgroup message is meant for the subgroup members when the message display is associated with a subgroup member, and
wherein the subgroup message is obscured to not display message contents when the message display is not associated with the subgroup member;
determining that a termination parameter associated with the subgroup is met; and
terminating the subgroup by merging one or more subgroup messages into group messages in the message display wherein merging the one or more subgroup messages comprises:
removing indications the one or more subgroup messages are meant for the subgroup members
wherein the one or more subgroup messages and group messages are displayed together based on a time of receipt, wherein indications that the one or more subgroup message are meant for the subgroup members are removed when the message display is associated with the subgroup member, and
wherein the one or more subgroup messages and group messages are displayed in ascending order based on a time of receipt, wherein the one or more subgroup messages are unobscured when the message display is not associated with the subgroup member.

17. The method of claim 16, wherein the subgroup message is displayed with an indication the subgroup message is meant for the subgroup members.

18. The method of claim 16, wherein outputting the subgroup message for display comprises:
outputting a renderable object to the at least one client device, wherein the renderable object renders a subsection within the message display for subgroup messages, and wherein the subgroup message is displayed in the subsection.

19. The method of claim 16, wherein the subgroup command further comprises a security setting, wherein the security setting indicates the subgroup message is to be viewed by only the plurality of members of the subgroup, and wherein outputting the subgroup message for display comprises displaying the subgroup message to only the one or more of the plurality of subgroup members in the message display.

20. The method of claim 16, further comprising:
receiving a termination parameter for the subgroup, wherein the termination parameter indicates the subgroup will terminate after the termination parameter is met;
determining that the termination parameter is met; and
terminating the subgroup.

* * * * *